United States Patent Office 2,794,730
Patented June 4, 1957

2,794,730

PROCESS FOR RAPIDLY DESULPHURIZING CAST IRON

René Perrin and Jean Lamberton, Paris, France, assignors to Societe d'Electro-Chimie d'Electro-Metallurgie et des Acieries Electriques d'Ugine, Paris, France No Drawing. Application July 29, 1952, Serial No. 301,600

Claims priority, application France August 6, 1951

1 Claim. (Cl. 75—55)

This invention relates to a process for rapidly desulphurizing cast iron and to a slag for use in such process.

In applicants' copending application Serial No. 266,596, filed January 15, 1952, now Patent No. 2,750,280, granted June 12, 1956, a process is disclosed which comprises adding to a steel bath a reducing agent such as silicon or aluminum, pouring the steel into a ladle and simultaneously mixing therewith particles of slag in a solid state, the slag containing as principal constituents a previously reacted mixture of fluorspar and lime in the proportions by weight of 60–85% fluorspar and 15–40% of lime, the slag containing not over 8% by weight of silica or other acidic constituents capable of combining with the lime in the slag.

The present invention relates to a process for rapidly desulphurizing cast iron and to a slag useful in such process. Cast iron has a lower melting point than steel, and accordingly, in order for a slag to be most effective for desulphurizing cast iron, it must have a melting point lower than a slag suitable for desulphurizing steel. We have found that slags having the desired low melting points and which are effective in desulphurizing cast iron can be made by adding up to about 20% of sodium fluoride or a fluoride or other halide of an alkali metal or an alkaline earth metal to a mixture containing, as principal constituents, fluorspar and lime in which the weight of the fluorspar is from 1.5 to 6 times the weight of the lime. Preferably, the fluorspar comprises from 60 to 85% by weight of the mixture and lime constitutes from 15 to 40% by weight of the mixture. The slags may be used in the usual manner in the liquid state, but a preferred method consists in melting the mixture, solidifying it and pulverizing it, or sintering the mixture and then pulverizing it so as to form solid particles of slag and adding these solid particles to the cast iron while it is being poured into a ladle. The particles will dissolve substantially instantaneously. This obviates the necessity of providing a slag melting furnace in the cast iron foundry.

In order that solid pulverized slag be effective practically instantaneously for desulphurizing cast iron when the slag is added to the cast iron while the latter is being poured into a ladle, the slag must have a very low melting point and a very high desulphurizing power. If the melting point of the slag is too high or if its desulphurizing power is too low, all of it will not melt and be effective when added in a solid state during the pouring of the cast iron into a ladle.

While according to our invention, the percentages of the ingredients of the slag can vary between 60–85% fluorspar, 15–40% lime and up to an addition of 20% of alkali metal or alkaline earth metal halide, it is preferred that the slag contain from 70 to 85% fluorspar and 15 to 30% of lime in addition to the halide.

While it is preferred that the slag consist essentially of fluorspar, lime and alkali metal or alkaline earth metal halide in the proportions previously mentioned, it can contain other fluxing agents of suitable character. The slag in order to be suitable in our process must have a very low melting point and must contain a sufficiently large proportion of free lime to be effective in desulphurizing the cast iron. If the lime exceeds about 40% of the weight of the slag, the slag does not have a sufficiently low melting point. On the other hand, lime in amount less than about 15% does not provide a sufficient quantity of lime to effectively desulphurize the cast iron. In our preferred compositions consisting essentially of fluorspar, lime and alkali metal or alkaline earth metal halide, almost all of the lime is present in the free state. If fluxing agents are to be added to such compositions, they must either be in such small amount or of such character that they will not combine with the free lime to a prohibitive extent which would lower the content of free lime and leave not enough of it available for combining with the sulphur of the cast iron. Therefore, if fluxing additions are made, we prefer that such fluxes be of a basic rather than an acidic character. Silica or other fluxes of an acidic character will combine with the lime and render it ineffective. Accordingly, in our slag, silica or other acidic constituents capable of combining with free lime should not exceed about 8% by weight of the slag. Fluxes which can be used in our slag are oxides or salts of the alkali metals, alkaline earth metals, or magnesium. We can also use alumina, either in its uncombined state or in combination, as for example calcium aluminate. Preferably the alkali metal, alkaline earth metal or magnesium compounds are used in the form of fluorides.

The desulphurizing slag can be prepared in solid, pulverized form in advance of its use in the desulphurizing process. It can be prepared by melting lime, fluorspar and sodium fluoride or other alkali metal or alkaline earth metal halide in the proportions previously indicated, the melt being then allowed to cool and then crushed to appropriate grain size. Instead of melting the ingredients of the slag, the ingredients can be combined by sintering in a kiln or other suitable equipment.

The desulphurizing process may be carried out in the following manner. The cast iron to be desulphurized is melted in a furnace and while it is in the furnace, a reducing agent such as silicon or aluminum is added to it if necessary (or if the metal does not contain a sufficient amount of such a reducing agent), the preferred amount of such reducing agent added to the iron being between 0.2% and 1.0%, based on the weight of the cast iron bath. The furnace slag is very carefully slagged off from the cast iron or a device for preventing slag from flowing with the cast iron is employed, and the cast iron is then poured into a ladle. While the cast iron is being poured into the ladle, the desulphurizing slag in the form of solid particles is added to the stream and is thereby automatically violently intermixed with the cast iron. A portion of the solid particles of slag may also be added to the ladle before the pouring of the cast iron begins. Pouring should be performed in big streams or from sufficient height so as to obtain an intimate and violent intermixing of the slag and cast iron. As soon as the pouring is completed and intermixing has ceased (the latter practically coinciding with the end of pouring), the slag rises to the surface of the cast iron bath. Thus the reaction is practically instantaneous. At that time or just before that time, a sufficient amount of lime or other basic material is added on top of the slag in the ladle to "dry" the slag. The lime dissolves very rapidly in the floating slag and thus lessens considerably its corrosive action on the refractories of the ladle. Experience has shown that the corrosive action, which is relatively small during intermixing, especially when such intermixing is rapid, becomes very strong from the moment when, once intermixing is completed, a layer of slag has formed upon the bath, If care is not taken to add lime at that time, the corrosive action of the slag begins very quickly, and continues throughout the time that the cast iron is being cast into molds. The addition of lime at the right moment allows practical suppression of this corroding action and renders possible the use of slags containing high proportions of calcium fluoride in the usual ladles. The addition of lime, of course, would be useless if ladle refractories used were particularly resistant to the slag.

The amount of lime to be added at the end of the desulphurizing operation depends, of course, upon the amount of slag used. It may be, for instance, two to four times the weight of the slag. Preferably the lime is added in the form of medium sized lumps, or in the form of grains. It is possible to replace lime partially or totally by other basic refractory materials which produce the same or a similar "drying" effect on the slag as does lime. For example, dolomite has been found to give good results.

As above pointed out, the previously prepared slag in the form of solid particles is added to the cast iron during pouring of the latter into a ladle. The grain size of the slag should not be so large that it does not melt during the desulphurizing treatment, nor should it be so small that it is blown out during the pouring of the cast iron. It has been found that a mixture of grains having a maximum diameter less than 2 mm. and containing less than 20% by weight of particles below 0.1 mm., is most satisfactory.

The amount of slag to be used varies according to the initial sulphur content of the cast iron and the desired final content. As an indication, a proportion by weight of 2 to 3% of slag based on the weight of the cast iron has been found to reduce the sulphur content from 0.045% to 0.025%.

The following example illustrates our process.

A slag was prepared by melting a mixture of fluorspar, lime and sodium fluoride, solidifying the slag and crushing it into grains having a diameter less than 2 mm. The average analysis of this slag was:

| | Percent |
|---|---|
| $SiO_2$ | 5.20 |
| $Al_2O_3$ | 2.10 |
| Lime | 21.50 |
| $CaF_2$ | 60.00 |
| NaF | 6.73 |
| $SO_3$ | 0.50 |

3,200 kgs. of pig iron were melted in a furnace, the iron after melting having the following composition:

| | Percent |
|---|---|
| C | 3.415 |
| S | 0.045 |
| Si | 0.169 |
| Mn | 0.210 |

The cast iron was carefully slagged off and 30 kgs. of silicon-manganese containing 30–35% silicon and 55–60% manganese were added to the cast iron in the furnace. The furnace was tilted and the cast iron was poured into a ladle while 90 kgs. of the solid crushed desulphurizing slag were thrown into the pouring steam. The level of the ladle was 1.5 m. below the pouring channel of the furnace, which resulted in a good intermixing of the cast iron and slag. The slag melted almost immediately and was dispersed into the cast iron. The temperature of the iron at the moment of pouring was about 1300° C., and the amount of desulphurizing slag employed represented a little less than 3% by weight of the iron.

As soon as pouring was completed, 250 kgs. of lime in grain form were thrown on top of the rising iron and slag in the ladle. The slag was allowed to rise for a few minutes. An examination of the ladle after casting showed no abnormal attack on the refractory lining.

The final composition of the cast iron was:

| | Percent |
|---|---|
| C | 3 |
| Si | 0.500 |
| Mn | 0.690 |
| S | 0.025 |

The invention is not limited to the preferred embodiment but may be otherwise embodied or practiced within the scope of the following claim.

We claim:

A process for rapidly desulphurizing cast iron, which comprises adding to a cast iron bath a reducing agent of the group consisting of silicon and aluminum, pouring the cast iron into a ladle and simultaneously mixing therewith particles of slag in a solid state, said slag containing as principal constituents a previously reacted mixture of fluorspar, lime and halide of metal of the group consisting of alkali metals and alkaline earth metals in the proportions, by weight, of 60–85% fluorspar, 15–40% lime, and up to 20% of said halide, said slag containing not over 8% by weight of acidic constituents capable of combining with the lime in the slag, and within a short time of completion of pouring, adding a basic material to the slag in the ladle to inhibit corrosive attack on the ladle lining.

References Cited in the file of this patent

UNITED STATES PATENTS

| 2,193,593 | Heuer | Mar. 12, 1940 |

FOREIGN PATENTS

| 23,534 | Great Britain | of 1892 |
| 458,242 | Canada | Jan. 19, 1949 |